United States Patent [19]

Bromley et al.

[11] 4,337,189

[45] Jun. 29, 1982

[54] POLYMERIZATION PROCESS

[75] Inventors: Charles Bromley, Bourne End; Morice W. Thompson, Maidenhead, both of England

[73] Assignee: Imperial Chemical Industries Limited, London, England

[21] Appl. No.: 214,337

[22] Filed: Dec. 8, 1980

[30] Foreign Application Priority Data

Dec. 6, 1979 [GB] United Kingdom ............... 7942093

[51] Int. Cl.$^3$ .............................................. C08K 5/09
[52] U.S. Cl. .................................. 523/332; 525/303; 526/202; 526/320; 526/322; 524/820; 524/824; 524/529; 524/533; 524/458
[58] Field of Search ..................... 260/31.2 N, 31.2 R, 260/32.6 N, 32.6 R, 32.8 R, 32.8 N, 33.4 R, 33.6 UA, 32.8 UA, 34.2, 32.4; 525/303; 526/202, 320, 322

[56] References Cited

U.S. PATENT DOCUMENTS

| | | | |
|---|---|---|---|
| 3,317,635 | 5/1967 | Osmond | 260/881 |
| 3,505,268 | 4/1970 | Backhouse et al. | 260/31.2 |
| 3,607,821 | 9/1971 | Clarke et al. | 260/34.2 |
| 3,666,710 | 5/1972 | Makhlouf et al. | 260/33.6 UA |
| 3,745,137 | 7/1973 | Reid et al. | 260/33.6 UA |
| 3,953,393 | 4/1976 | Rumlow et al. | 260/31.8 R |
| 3,963,685 | 6/1976 | Abrahams | 526/230 |
| 4,025,484 | 5/1977 | Evani et al. | 260/33.6 UA |
| 4,180,619 | 12/1979 | Makhlouf et al. | 526/202 |

Primary Examiner—J. L. Schofer
Assistant Examiner—Bernard Lipman
Attorney, Agent, or Firm—Cushman, Darby & Cushman

[57] ABSTRACT

A process is described for making sterically stabilized non-aqueous dispersions of polymer microparticles, in which (1) monomers including at least one crosslinking monomer are polymerized in an aqueous medium at a temperature at least 10° higher than the glass transition temperature of the polymer to be formed, in the presence of a block or graft copolymer stabilizing agent containing in the molecule, as the component solvated by the aqueous medium, a polymer chain derived from a polyethylene glycol of molecular weight at least 1000, under conditions such that there is at no time present a separate monomer phase and (2) the microparticles thus obtained are transferred into a non-aqueous medium which is capable of dissolving the polyethylene glycol in question, when the latter is in the non-hydrated state, to the extent of at least 10% by weight at room temperature. The microparticles are of value for incorporation into coating compositions the main film-forming constituent of which is compatible with the polyethylene glycol-derived stabilizing chains of the particles.

9 Claims, No Drawings

POLYMERIZATION PROCESS

This invention relates to the production of cross-linked polymer microparticles suitable for incorporation in coating compositions in order to modify the rheological properties of the compositions and/or the physical properties of the coatings obtained therefrom.

There have previously been described a variety of coating compositions which incorporate polymer microparticles that are insoluble in, but stably dispersed in, the binder. Reference may be made to British Patent Applications Nos. 17122/77, 17123/77, 17124/77, 17125/77, 30236/77, 33500/77, 871/78, 20096/78 (German OLS Nos. 2818093, 2818094, 2818095, 2818100 and 2818102, European Applications Nos. 78300095 and 78300419), as well as to British patent specifications Nos. 1,242,054, 1,451,948 and 1,538,151, and U.S. Pat. Nos. 3,929,693, 4,025,474 and 4,115,472. In general, the microparticles are incorporated in the coating compositions for either or both of two reasons: (i) in order to modify the rheological characteristics of the composition, which influence its behaviour on application to a substrate; (ii) in order to modify the mechanical or physical properties of the coating which is obtained after application of the composition to the substrate.

Microparticles which have been described in the foregoing patent literature are of both simple and composite types. The simple type of microparticles is an essentially spherical particle of colloidal dimensions which is homogeneous with respect to the polymer of which it is composed; its required insolubility in the binder component of the coating composition is achieved either by choosing as the polymer in question one which is inherently insoluble in the binder, or by introducing a sufficient degree of crosslinking into a polymer which otherwise would be soluble in the binder. The composite type of microparticle has a spherical core which is of a similar nature to the simple type of particle, but the core is associated with an outer layer of a second polymer which is not crosslinked; this second polymer is frequently chosen so as to be compatible with the main film-forming resin of the coating composition into which the microparticles are to be incorporated.

Methods for preparing the microparticles, by polymerisation of appropriate monomers, are also of various types. Of particular interest are those procedures in which the resulting polymer is obtained directly in particulate form as a dispersion in a liquid which is a non-solvent for the polymer. The particles so obtained can be separated from the dispersion liquid and then incorporated in the coating composition, or, in suitable cases, the dispersion itself can be blended with the other constituents of the coating composition. Two procedures are commonly used for making such dispersions : (i) the non-aqueous dispersion polymerisation technique, in which the monomer is polymerised in an inert organic liquid which dissolves the monomer but not the resulting polymer, in the presence, dissolved in the liquid, of a polymerisation initiator and of a polymeric stabiliser whereby the resulting disperse particles are sterically stabilised against gross flocculation; (ii) the aqueous emulsion polymerisation technique, in which the monomer is polymerised as an emulsion in water, in the presence of a water-soluble polymerisation initiator and of a water-soluble surface-active agent, the polymer particles in this case being stabilised against gross flocculation largely as a result of their carrying electrical charges.

The available methods do, however, suffer from certain limitations in respect of the kind of microparticle which can be successfully made by them. In the case where the microparticles are required for the modification of the mechanical properties of a coating, in particular where it is desired to reduce the brittleness of a film without resorting to the use of an external plasticiser, the microparticles should be rubbery at ambient temperatures. This in turn requires that the polymer of which the microparticles are composed should be derived predominantly from so-called "soft" monomers such as ethyl acrylate, propyl acrylate, 2-ethylhexyl acrylate, butyl methacrylate, 2-ethoxyethyl methacrylate, vinyl acetate or vinyl propionate. Such monomers do not, however, readily lend themselves to polymerisation by non-aqueous dispersion techniques because of the difficulty of finding an inert liquid in which they are soluble but the derived polymer is insoluble; homopolymers or copolymers of these monomers tend to be appreciably soluble in the aliphatic hydrocarbon liquids which are the favoured media for dispersion polymerisation of monomers such as methyl methacrylate, and in consequence it is very difficult to obtain them in stable, disperse form. Furthermore, where it is desired that the microparticle polymer should be cross-linked, non-aqueous dispersion techniques have the further limitation that, unless special precautions are taken, cross-linking must be effected after the main polymerisation of the monomer is complete, otherwise the utilisation of the stabiliser is inefficient and there is a risk of the particles flocculating during the polymerisation. In practice, this rules out the introduction of cross-linking by the use of comonomers which are polyfunctional with respect to the polymerisation reaction, e.g. ethylene glycol dimethacrylate, and it is necessary instead to employ comonomers containing mutually reactive groups through which covalent linkages can be generated, preferably in a separate, subsequent operation.

These difficulties can be avoided by polymerising such monomers, including polyfunctional monomers if desired, by the aqueous emulsion technique, but a different problem then arises, namely the presence in the dispersion of ionic species derived from the initiator and/or the surfactant used. In order to render the particles thus obtained suitable for incorporation in coating compositions, more especially compositions based on non-aqueous diluents, it is necessary to free the particles as far as possible from these ionic species, usually by first precipitating the particles from the aqueous dispersion, then washing them with water and finally drying them. It is clearly a disadvantage to have to carry out these three intermediate operations, and in any event the removal of ionic species thereby is usually incomplete.

In our co-pending British Application No. 7942092 we have described a process for producing stable dispersions in non-aqueous media of composite, cross-linked polymer microparticles, which avoids the difficulties or limitations discussed above and which consists in the steps of (1) dispersion polymerising the appropriate monomer or monomers in an aqueous medium under defined conditions such that the crosslinked polymer particle cores formed are sterically stabilised in dispersion in the medium in question, (2) polymerising, in the dispersion obtained in step (1) and again under defined conditions, one or more monomers such as to yield a non-crosslinked second polymer, and (3) transferring the polymer microparticles from the resulting dispersion into a non-aqueous medium under such conditions that the particles become stably dispersed therein.

We have now found that, in the particular case where the crosslinked particle cores are sterically stabilised in the aqueous medium by means of polymer chains derived from a polyethylene glycol which are solvated by that medium, it is possible to transfer such particle cores directly to a non-aqueous medium of a particular specified type, so as to yield a stable dispersion of particles in that latter medium, without the need to produce any non-crosslinked second polymer in association with the particles.

Thus according to the present invention we provide a process for the production of a stable dispersion in a non-aqueous liquid medium of microparticles of diameter from 0.01 to 10 microns composed of a crosslinked polymer, the process comprising the steps of (1) polymerising one or more ethylenically unsaturated monomers, including at least one crosslinking monomer, from which the crosslinked polymer is to be derived, in an aqueous medium as hereinafter defined at a temperature at least 10° higher than the glass transition temperature of the polymer in the presence in the aqueous medium as steric stabiliser of a block or graft copolymer which contains in the molecule (i) a polymeric component which is solvatable by the aqueous medium and which consists of at least one polymer chain derived from a polyethylene glycol of mol. wt. at least 1000, and (ii) another polymeric component which is not solvatable by the aqueous medium and is capable of becoming associated with the polymer microparticles formed, the concentration of free monomer in the polymerisation mixture being maintained throughout this process step at a level such that at no time does the free monomer form a separate phase and the total amount of monomer polymerised being such that the resulting dispersion contains at least 20% by weight of microparticles, and (2) transferring the polymer microparticles from the resulting dispersion into a non-aqueous liquid medium, the said liquid medium being one which is capable of dissolving, to the extent of at least 10% by weight at room temperature, the polyethylene glycol from which the above-mentioned solvatable component of the block or graft copolymer is derived when the said polyethylene glycol is in a non-hydrated state.

By "aqueous medium" we mean herein a mixture comprising (a) at least 30% by weight of water and (b) not more than 70% by weight of a second constituent which is miscible with water, the nature and proportion of which are such that the mixture as a whole is capable of dissolving the monomer or monomers being polymerised to the extent of at least 3% by weight but is a non-solvent for the polymer formed. The second constituent may be a single substance or it may be a water-miscible mixture of two or more substances.

Preferably the aqueous medium is capable of dissolving the monomer or monomers to the extent of at least 10% by weight.

By "glass transition temperature" (Tg) we mean the temperature at which the polymer which is produced in the process of the invention passes from the glassy state to the rubbery state, or vice versa. The Tg value in question will normally be that of the bulk polymer as 100% material, but in a case where, as subsequently described, a plasticising substance is deliberately added to the polymerisation mixture for the purpose of reducing the effective Tg of the polymer, the Tg value for the purposes of the invention is that of the plasticised polymer. Even where a plasticiser for the polymer is not added as such, the "environmental" Tg of the polymer under the conditions obtaining during polymerisation may be somewhat lower than the bulk Tg value referred to above, owing to some plasticisation of the polymer by residual monomer or other constituents of the polymerisation mixture. Thus it may be possible in practice to operate with a somewhat minimum polymerisation temperature than that indicated by the bulk Tg value. However, the effect of such fortuitous plasticisation on the Tg value is difficult to predict and, whilst it can in principle be determined by simple trial and error, it is more convenient under these conditions to choose the temperature of polymerisation by reference to the bulk Tg value. The Tg of a bulk polymer, or of a deliberately plasticised polymer, may be determined for the present purposes, by experimental methods which are well known to those skilled in the art, upon polymer of the same composition as that which is to be formed in the process of the invention but obtained by some other route, for example by polymerisation of the monomers in bulk or in solution, with subsequent addition of plasticiser where appropriate. Alternatively, Tg values can be calculated, from a knowledge of the monomer composition of the polymer, by known methods.

By way of illustration, the following bulk Tg values may be quoted (ratios stated are by weight): for a 50:50 methyl methacrylate/butyl acrylate copolymer, 4° C.; for a 80:20 methyl methacrylate/2-ethylhexyl acrylate copolymer, 41° C.; for a homopolymer of ethyl acrylate, −22° C.; for a homopolymer of methyl methacrylate plasticised in the ratio 60:40 with a neopentyl glycol/butyl alcohol adipate polyester plasticiser, 55° C. Any of these polymer compositions can be successfully prepared in the form of an aqueous latex by the process of the invention at the polymerisation temperatures in the range 70°–90° C. which are normally employed for the polymerisation of acrylic monomers in the presence of an azo initiator.

Ethylenically unsaturated monomers which may be used in step (1) of the process of the invention include in particular the acrylic monomers, that is to say acrylic acid or methacrylic acid and their alkyl esters such as methyl methacrylate, ethyl methacrylate, butyl methacrylate, ethyl acrylate, butyl acrylate, hexyl acrylate, n-octyl acrylate, lauryl methacrylate, 2-ethylhexyl acrylate, nonyl acrylate, lauryl acrylate, benzyl methacrylate and cetostearyl acrylate, the hydroxyalkyl esters of the same acids such as 2-hydroxyethyl acrylate, 2-hydroxyethyl methacrylate and 2-hydroxypropyl methacrylate, and the nitriles and amides of the same acids such as acrylonitrile, methacrylonitrile, acrylamide and methacrylamide. Other monomers which may be used, either alone or in admixture with these acrylic monomers, include vinyl aromatic compounds such as styrene, tert-butyl styrene, and vinyl toluene, vinyl esters of organic and inorganic acids such as vinyl acetate, vinyl propionate and vinyl chloride. Yet other co-monomers which may be used in conjunction with any of the foregoing monomers include dialkyl maleates, dialkyl itaconates, dialkyl methylene-malonates, isoprene and butadiene.

Preferred crosslinking monomers which may be used, in order to effect crosslinking of the polymer of the microparticles, are monomers which are polyfunctional with respect to the polymerisation reaction, including the esters of unsaturated monohydric alcohols with unsaturated monocarboxylic acids, such as allyl acrylate, allyl methacrylate, butenyl acrylate, butenyl methacrylate, undecenyl acrylate, undecenyl methacrylate, vinyl acrylate and vinyl methacrylate, dienes such as butadiene and isoprene, esters of saturated monohydric alcohols with poly-unsaturated carboxylic acids such as ethyl sorbate and diethyl muconate, the diesters of saturated glycols or diols with unsaturated monocarboxylic acids, such as ethylene glycol diacrylate, ethylene glycol dimethacrylate, polyfunctional aromatic compounds such as divinylbenzene and other doubly unsaturated compounds such as the methacrylic acid ester of ethylene glycol monodicyclopentenyl ether.

Alternatively, crosslinking may be achieved by including, in the monomers being polymerised, pairs of crosslinking monomers, each member of the pair carrying a functional group which can enter, under the conditions of polymerisation, into a condensation-type reaction with a complementary functional group carried by the other member of the pair. Examples of suitable pairs of monomers include glycidyl(meth)acrylate + (meth)acrylic acid and glycidyl(meth)acrylate + (meth) acrylic anhydride.

The proportion of crosslinking monomer or monomers may vary according to the degree of crosslinking which it is desired that the polymer should exhibit, but in general a proportion of 0.2–10%, preferably 0.5–1%, based on the total monomer weight, is suitable.

According to the monomer or monomers from which the polymer forming the microparticles is derived, that polymer may be either rubbery or glassy at room temperature, that is to say, it may have a Tg which lies either below or above room temperature, respectively. The choice of Tg depends to some extent upon the purpose for which the composite microparticles are to be incorporated in a coating composition; in particular, where it is desired to modify the mechanical or physical properties of the ultimate coating film, the polymer is preferably rubbery at room temperature, and more preferably has a Tg below $-20°$ C. An upper limit to the Tg of the polymer may be set by the practicality of carrying out the polymerisation at a temperature at least 10° higher than the Tg of that polymer.

Preferably, the temperature of polymerisation of the monomer or monomers is at least 20° C., more preferably at least 30° C., higher than the glass transition temperature of the polymer which is formed. In general, polymerisation temperatures in the range 30°–80° C. are convenient.

Thus, in principle, the temperature at which the polymerisation is carried out will be determined first and foremost with reference to the Tg value of the polymer which it is proposed to produce in dispersion, and, having decided upon that temperature, one will then proceed to choose an appropriate composition for the aqueous medium in which the process is to be conducted. In order to help the maintaining of a constant polymerisation temperature, it is preferred to arrange that the aqueous medium can boil under reflux at that temperature, and the nature and proportion of the water-miscible second constituent of the mixture will then be selected with this object in mind. Having regard to the fact that, for many of the monomers likely to be used in the process, an effective polymerisation temperature will lie in the range 70°–90° C., the second constituent of the aqueous medium, or a constituent thereof, will usually require to be a liquid of boiling point significantly lower than that of water.

In practice, there may be some interaction between these variables; for example, the freedom of choice of composition of the aqueous medium to suit a particular operating temperature may be restricted by the need to find a water-miscible second constituent which does not have a strong solvent action on the polymer which is formed, otherwise the aqueous medium as a whole may not be a non-solvent for the polymer and there may be a significant production of polymer in solution rather than in dispersion. In the case where the aqueous medium contains a relatively volatile water-miscible liquid, the available range of formulations may be increased by including therein a further water-soluble constituent which does not boil below the boiling temperature of water; such a further constituent may be either a solid or a liquid, capable of assisting the achievement of the necessary solvent/non-solvent characteristics in the aqueous medium. It will be desirable, however, to retain a sufficient proportion of the lower-boiling constituent to permit refluxing of the polymerisation mixture. Another factor to be borne in mind is the desirability or otherwise of the continuous phase of the final dispersion permanently containing materials other than water only. Where the water-miscible liquid constituent of the aqueous medium is sufficiently volatile to permit refluxing at the polymerisation temperature, that constituent can usually, if desired, be stripped off by distillation when polymerisation is complete. In contrast, a water-miscible constituent of higher boiling point may not be removable from the continuous phase in this way.

The use of the term "aqueous medium" herein does not imply that water should always be the major constituent of the medium in which the polymerisation is carried out; in many cases, the water-miscible constituent or constituents may predominate in the mixture. In practice, as high a proportion of water as possible is employed, consistent with the aqueous medium being capable of dissolving the monomer being polymerised at least to the extent necessary to avoid the existence of a separate monomer phase, and at the same time being a non-solvent for the polymer produced. Evidently the degree of solvency for the monomer which the aqueous medium is required to possess will depend upon the concentration of free monomer in the polymerisation mixture which it is desired to maintain during the process, which in turn will depend upon the rate at which it is desired that the polymerisation should proceed. In practice, water will most usually constitute 30–70% by weight of the aqueous medium.

Substances which are suitable for use as the water-miscible constituent of the aqueous medium include in particular the lower aliphatic alcohols; the preferred member of this class is methanol, but ethanol is also very suitable. Water-methanol mixtures can be prepared having boiling points which lie both in the optimum polymerisation temperatures range and sufficiently above the polymer glass transition temperatures for the process of the invention to be carried out satisfactorily in such mixtures with a variety of acrylic or vinyl monomers. Ethanol is somewhat less preferred than methanol because its greater effectiveness as a chain terminator in the polymerisation process may make it difficult to obtain a disperse polymer of high molecular weight, and also because it is a more active solvent for many polymers than is methanol. Nevertheless, ethanol is useful where the monomer mixture to be polymerised contains appreciable proportions of styrene. In the case of polymers derived from acrylic or methacrylic esters of higher alcohols, e.g. lauryl methacrylate, a suitable water-miscible constituent is acetonitrile.

Suitable water-miscible substances having a boiling point above that of water include, for example, butanol, 2-methoxyethanol, 2-ethoxyethanol, ethylene glycol, diethylene glycol and tetraethylene glycol. In general, the proportion of such substances which it is possible to use in the aqueous medium will be relatively low because they tend to be effective solvents for many polymers.

Although simple experimentation may sometimes be called for, the formulation of a suitable aqueous medium which meets the various requirements set out above does not present any serious difficulty in the majority of cases, especially if the Tg of the polymer to be formed does not exceed 60° C.

Steric stabilisation of the polymer microparticles produced in step (1) of the process is achieved by the presence in the polymerisation mixture of the block or graft copolymer. This copolymer contains in the molecule a polymeric component which is solvatable by the aqueous medium and which consists of at least one chain derived from a polyethylene glycol of molecular weight at least 1000, and another polymeric component which is not solvatable by the aqueous medium and is capable of becoming associated with the polymer microparticles. This copolymer may be introduced into the polymerisation mixture in various ways. Firstly, it may be introduced as a fully pre-formed starting material, prepared in a separate operation. Secondly, it may be formed in situ during the polymerisation step (1) by introducing into the polymerisation mixture, before polymerisation begins, a "precursor" compound comprising in its molecule a polyethylene glycol residue and an unsaturated grouping which is capable of copolymerising with the monomer or monomers being polymerised. Thirdly, it may be formed, again in situ, by introducing into the polymerisation mixture before polymerisation begins a water-soluble simple polymer of molecular weight at least 1000 which contains in the molecule the chain of a polyethylene glycol, or a monoalkyl ether thereof, and also hydrogen atoms which are abstractable by free radicals under the conditions of polymerisation.

The use of a pre-formed block or graft copolymer as stabiliser in an aqueous dispersion polymerisation process is described in detail in British Patent Application No. 79 24 873. In the present case, the solvatable polymeric component of the copolymer is derived from a polyethylene glycol, or a monoalkyl ether of a polyethylene glycol of molecular weight at least 1000, preferably one having a molecular weight in the range 2000–4000.

The second component of the block or graft copolymer, which is capable of associating with the disperse microparticles, can in the simplest case be of identical or similar chemical composition to the disperse polymer itself, which by definition is insoluble in (and therefore not solvated by) the aqueous medium. Such a polymeric component will have an inherent tendency to associated with the disperse polymer. However, any polymer which satisfies the more general requirement of non-solvatability by the aqueous medium is suitable as the second component. Examples of second polymeric components include polymers and copolymers derived from methyl methacrylate, ethyl acrylate, butyl acrylate, styrene, tertbutylstyrene, vinyl toluene, vinyl acetate and acrylonitrile; there may also be incorporated together with one or more of these monomers a functional monomer such as acrylic acid, methacrylic acid, 2-hydroxyethyl methacrylate and 2-hydroxyisopropyl methacrylate.

The pre-formed block or graft copolymer may range in structure from simple block copolymers of the AB, ABA or BAB types, where A and B represent the solvatable and non-solvatable components respectively, through multiple block copolymers of the ABABAB... types, to "comb" type graft copolymers of the structure $A_nB$, in which a plurality of the solvatable A components are attached at intervals to a polymer backbone constituting the hydrophobic, associatable B component. Preferably the copolymer is of this last-mentioned, "comb" type and has a slight weight excess of the solvatable components A over the non-solvatable components B, for example in a ratio of from 1.1:1 to 2:1. It is also preferred that, in this type of copolymer, the value of n, i.e. the number of A components which are attached to each B component, should be in the range of 3–10.

The molecular weight of each solvatable A components is, as already stated, at least 1000 and preferably at least 2000, the molecular weight of each non-solvated B component is preferably at least 1000. Moreover, it is preferred that the total molecular weight of the copolymer should be at least 5000.

The block or graft copolymer may be made by any of the methods which are well known in the art. Thus the solvatable component, in the form of a suitable derivative of the polyethylene glycol, may be copolymerised with the appropriate monomers so as to build up the non-solvatable, associating component, or one may start with the pre-formed non-solvatable component and produce the required poly(oxyethylene) chain in situ. Alternatively, the non-solvatable component can be prepared separately and then be covalently linked to the solvatable component through the medium of suitable mutually reactive groups. Thus, for example, in the preparation of the preferred "comb" type graft copolymers, the mono-methyl ether of a polyethylene glycol of molecular weight at least 2000, can be converted to the acrylic or methacrylic ester, and this intermediate product can then be subjected to free radical-initiated copolymerisation with other unsaturated monomers such as styrene, ethyl acrylate or methyl methacrylate, in order to build up an appropriate non-solvatable polymer backbone constituting the B component from which are pendant a plurality of the A component side chains. Another suitable type of addition copolymer may be made by means of ionic polymerisation methods, for example by preparing a "living" polystyrene block and then reacting this with ethylene oxide in order to build up a poly-(oxyethylene) block attached thereto.

If desired, the non-solvatable component of the block or graft copolymer employed as stabiliser may contain groupings which are capable of reacting with the monomer or monomers which are being polymerised in the process of the invention. By this means, the stabiliser becomes covalently linked to the disperse polymer and the stability of the latter towards flocculation may be enhanced. Suitable reactive groupings include ethylenically unsaturated groupings which can copolymerise with the monomer, or functional groups which can react under the conditions of polymerisation with complementary functional groups in the mononer, e.g. epoxide groups which can react with a hydroxylic monomer such as 2-hydroxyethyl methacrylate. Methods of introducing such reactive groupings into the copolymer molecule will be apparent to those skilled in the art; for example, in the preparation of a "comb" type graft copolymer as outlined above, the unsaturated monomers with which the intermediae acrylic or methacrylic ester of polyethylene glycol is copolymerised may include an epoxide group-containing monomer, such as glycidyl acrylate or glycidyl methacrylate. In this way, the non-solvatable polymer backbone of the copolymer which is built up will be caused to contain pendant glycidyl groups. The latter may be utilised directly to react with a main monomer containing a functional group, such as a hydroxyl group, during the polymerisation process of the invention. Alternatively, the graft copolymer containing the glycidyl groups may be reacted further with an ethylenically unsaturated acid, such as acrylic acid or methacrylic acid, whereby there are introduced into the non-solvatable component of the copolymer double bonds which can copolymerise with the main monomer or monomers during the polymerisation process.

Where the block or graft copolymer stabiliser is formed in situ during the polymerisation step (1) of the process, according to the second mode of operation outlined above, and as described in more detail in British Application No. 47585/78, the "precursor" compound will be a derivative of a polyethylene glycol, or a monoalkyl ether thereof, of molecular weight at least 1000, preferably in the range of 2000–4000, containing a copolymerisable unsaturated grouping, which may conveniently be an ester of the glycol with a copolymerisable unsaturated acid, for example methacrylic acid, itaconic acid or maleic acid. Esterification of the glycol, or ether thereof, may be effected by an ester-interchange reaction with a lower alkyl ester of the unsaturated acid, for example with methyl methacrylate; alternatively the glycol or its ether may be reacted with a suitable acid chloride, for example methacrylyl chloride, in the presence of a hydrogen chloride acceptor. Yet again, the glycol or its ether may be reacted directly with the unsaturated acid to give the ester, or with its anhydride to form a half-ester. Other suitable precursors may be obtained by reacting a carboxyl group-terminated polyvinylpyrrolidone (see British specification No. 1,096,912) with glycidyl methacrylate. Yet other suitable precursors may be obtained by the procedure described in copending British Patent Application No. 47584/78, that is to say by reacting a water-soluble polyalkylene glycol or its monoalkykl ether with a cyclic aliphatic carboxylic anhydride and then reacting the resulting half-ester with an epoxy compound containing a polymerisable double bond. For example, the monoethyl ether of a polyethylene glycol is reacted with succinic anhydride and the product then condensed with glycidyl methacrylate to give a precursor containing a terminal vinyl grouping. As explained in the copending Application referred to, this method of making a precursor is convenient in particular because it avoids the necessity of removing any by-products or excess reagents, which could interfere with the subsequent use of the precursor, that arises with most of the other methods discussed above.

Where the block or graft copolymer stabiliser is formed in situ according to the third mode of operation outlined above, as described in detail in British Patent Application No. 7921091, the water-soluble simple polymer which is introduced into the polymerisation mixture may be an unmodified polyethylene glycol, or a monoalkyl ether thereof, of molecular weight at least 1000, since such a substance already contains a plurality of hydrogen atoms which are abstractable by free radicals under the conditions of polymerisation. The efficiency of grafting of the monomers being polymerised on to this polymer molecule may, however, be enhanced if desired by modifying the molecule so that it contains groups which are especially susceptible to hydrogen abstraction.

The proportion of the block or graft copolymer stabiliser which is required to be present during the polymerisation process of step (1) will vary to some extent according to the particular disperse polymer which is concerned and the particle size which it is desired that the resulting dispersion should have. The optimum proportion in any individual case can readily be found by simple experiment, whether the copolymer be pre-formed and added as such or formed in situ from either a copolymerisable precursor or a water-soluble simple polymer. Whichever of these three modes of operation is adopted, however, it may be stated for general guidance that the proportion of material added (i.e. pre-formed copolymer, precursor or water-soluble polymer) will normally lie in the range 0.5–20%, and more especially 2–10%, by weight of the disperse polymer content of the dispersion being made.

Step (1) of the process of the invention will normally require the presence in the polymerisation mixture of a suitable catalyst or initiator capable of producing free radicals. Suitable substances for this purpose are those catalysts or initiators well known for use in the polymerisation of acrylic or vinyl monomers which are soluble in the monomers, in particular azo compounds such as azodiisobutyronitrile and 4,4-azobis(4-cyanovaleric acid), or peroxy compounds such as benzoyl peroxide, lauroyl peroxide and diisopropyl peroxydicarbonate. To some extent, the choice of initiator can influence the temperature at which the polymerisation is carried out and thus may constitute a further factor to be considered in deciding the overall composition of the polymerisation mixture as discussed above. Furthermore, the type of initiator used may vary according to the manner in which the block or graft copolymer stabiliser is to be introduced into the polymerisation mixture. Where the copolymer is pre-formed and is introduced as such, azo compounds are generally to be preferred because of their reduced tendency, as compared with peroxy compounds, to promote random grafting of the monomers being polymerised on to the block or graft copolymer; such grafting could lead to decreased efficiency of the copolymer as a sferic stabiliser for the disperse polymer formed. The same preference applied in the case of in situ production of the copolymer via a copolymerisable precursor, since here the deliberately introduced unsaturated grouping in the precursor is designed to be the exclusive grafting point and additional, random, grafting could again lead to difficulties. In contrast, where the copolymer is to be produced in situ by hdyrogen abstraction grafting on to a water-soluble simple polymer, the preference is for peroxy compounds as initiators because of their known ability to promote grafting by this mechanism.

Whichever type of catalyst or initiator is used, the amount required will normally lie in the range 0.1-2.0%, preferably 0.5%-2%, of the weight of monomer, and the addition of this ingredient is preferably made along with the monomers being polymerised.

There may also be present during the polymerisation process, where necessary, a chain transfer agent which, unlike the catalyst or initiator, is soluble in the aqueous medium. Examples of suitable agents are n-octyl mercaptan and tert-dodecyl mercaptan. The chain transfer agent may be used in an amount of from 0.1% to 2% of the weight of monomer. The effect of the chain transfer agent is to regular the molecular weight of the disperse polymer and ultimately to reduce the proportion of finer particles in the disperse phase, thus increasing the average particle size. Such measures to regular molecular weight are not, however, usually necessary where an alcohol, such as methanol or ethanol, is employed as the water-miscible constituent of the aqueous medium. In particular, it is preferred not to use an additional chain transfer agent in the case of the in situ production of the copolymer stabiliser by hydrogen abstraction grafting on to a water-soluble simple polymer.

In carrying out step (1) of the process of the invention, it is preferred to introduce the monomer or monomers gradually into the aqueous medium, rather than to add the total monomer charge all at once. This procedure may in fact be essential in many cases if the condition is to be satisfied that at no time during the polymerisation should there be present a separate monomer phase. Where two or more monomers are involved, these may be pre-mixed before being fed into the aqueous medium. A particularly preferred procedure, whereby improved control of particle size of the disperse polymer is achieved, is to add initially to the aqueous medium a small portion of the total monomer charge, together with an appropriate amount of initiator. This initial charge, which may be added all at once provided that the aqueous medium is capable of dissolving it completely, is allowed to polymerise first; the reaction mixture is initially clear and homogeneous, but subsequently becomes opalescent as a very fine "seed" dispersion of polymer is formed. Following this, the main portion of the monomer charge, containing initiator, is fed in steadily at a rate sufficient to maintain an acceptable speed of polymerisation but not such as to cause monomer to form a separate phase in the polymerising mixture. Where the polymerisation is carried out at the reflux temperature of the aqueous medium, it is preferred to arrange for this main monomer feed to mix with the returning distillate so that it is well diluted before it enters the reaction zone; this distillate will normally be rich in the second, water-miscible constituent of the aqueous medium and will be a good solvent for the monomer being introduced. The rate of monomer feed is preferably such that the monomer is diluted with at least its own volume of returning distillate.

The manner of introduction of the pre-formed copolymer stabiliser, the copolymerisable precursor or the graftable single polymer, as the case may be, into the polymerisation mixture may vary somewhat according to circumstances. In every case, some portion of the ingredient in question is added prior to the commencement of polymerisation; thus, where a preliminary "seed" stage is operated, at least part of the total charge of either a preformed copolymer or a precursor is added along with the initial charge of monomer and the remainder of the copolymer or precursor is then introduced in the subsequent feed of the main part of the monomer charge. If the seed stage procedure is used in the case of a simple polymer which is to undergo grafting, the whole of the requisite amount of that material should be introduced with the initial monomer charge.

Where step (1) of the process is carried out using a simple polymer graftable by hydrogen abstraction, it may assist in achieving a high degree of grafting of this material if it is pre-activated before it is introduced into the polymerisation mixture. This may be done by heating it, preferably dissolved in some of the aqueous medium to be used subsequently, together with the polymerisation initiator at a temperature in the range of 65° to 120° C. for a period of from 5 minutes to 1 hour; the conditions chosen should, of course be such as not to cause the soluble polymer to undergo degradation, crosslinking or other deleterious changes.

In the case where the process of the invention is performed, as described above, by gradual "feed" of monomer to a preformed "seed" dispersion of polymer, it is possible to form the "seed" particles from monomer different from that which is subsequently introduced in the "feed" stage. Such "seed" monomer does not need to satisfy the requirement hereinbefore stated that the polymerisation temperature should be at least 10° C. higher than the glass transition temperature of the polymer (viz. the "seed" polymer) which is formed. Thus, essentially any monomer may be used in the "seed" stage so long as it does not form a separate phase in the reaction mixture and so long as it gives rise to a polymer which is insoluble in the aqueous medium. For example, where the main disperse polymer is to be derived from a mixture of methyl methacrylate and 2-ethylhexyl acrylate (Tg of the polymer, approximately $-10°$ C.; polymerisation temperature, 76°–80° C.), it is possible to employ methyl methacrylate alone (Tg of polymer, 105° C.) in a "seed" stage; the main monomers are then introduced in the "feed" stage to give rise to the main disperse polymer. It is, however, to be understood that, in a "seed-feed" procedure as just described, the "feed" stage must always be conducted in accordance with the definition of the process of the invention hereinabove given.

Other substances which may be added to the polymerisation mixture in step (1) include, as already mentioned, a plasticiser for the disperse polymer, where it is desired that the latter should be softer than the unmodified polymer. The addition of plasticiser may, indeed, render it possible to apply this step of the process of the invention to certain monomers where it would otherwise fail. For example, the homopolymer of methyl methacrylate has a Tg of 105° C. and it is practically impossible to operate the present process with methyl methacrylate as the sole monomer so as to produce a stable latex; however, by the addition of plasticiser the Tg can be brought down to a level where the process can successfully be carried out. Suitable plasticisers are any of those which are well known in the art for use with the particular polymer in question; they may be either soluble or insoluble in the aqueous medium. Conveniently the plasticiser may be added to the polymerisation mixture along with the monomer or monomers.

The product of step (1) of the process of the invention is an aqueous dispersion of polymer microparticles, which may have disperse phase contents in the range 40–60% by weight and even as high as 70% by weight. The particles are sterically stabilised against gross flocculation by means of the polyethylene glycol chains of the block or graft copolymer which are hydrated by the aqueous medium and in consequence adopt an extended configuration therein. In step (2) of the process, these microparticles are transferred to a non-aqueous liquid medium which, as already defined, is capable of dissolving, to the extent of at least 10% by weight at room temperature, the polyethylene glycol from which the above-mentioned chains are derived when that polyethylene glycol is in the non-hydrated state. Step (2) therefore consists in removing the water of hydration from the stabilising chains of the microparticles resulting from step (1), and simultaneously introducing the microparticles into the specified non-aqueous medium, whereupon the polyethylene glycol chains now become solvated by that medium, once again adopting an extended configuration and so stabilising the microparticles in their new environment.

The selection of a suitable non-aqueous liquid which satisfies the foregoing condition may be based upon the results of simple solubility tests performed upon the appropriate non-hydrated polyethylene glycol, but for general guidance it may be stated that the majority of suitable liquids belong to the class having solubility parameters in the range 8.5 to 14.5. Examples of suitable liquids include toluene, xylene, chloroform, carbon tetrachloride, cyclohexanone, dimethylformamide, acetonitrile, butanol, ethyl acetate and butyl acetate. Mixtures of such liquids may be employed if desired. The non-aqueous liquids may be either miscible or immiscible with water.

The transfer of the microparticles from the aqueous dispersion to the chosen non-aqueous liquid is accomplished by blending the two materials and then removing the water and the water-miscible second constituent of the aqueous medium by distillation.

A particularly convenient procedure is available in the case where the non-aqueous medium forms an azeotrope with water and with the second constituent, namely to add the aqueous dispersion from step (2) gradually to the non-aqueous medium maintained at its boiling point, so that the water and second constituent are rapidly removed as an azeotropic distillate. There is then finally obtained a stable dispersion of the microparticles in the non-aqueous liquid alone, the solids concentration of which can then be adjusted as desired either by evaporation or by addition of further liquid. Where the non-aqueous liquid does not form an azeotrope with either the water or the second constituent, the latter materials can be removed by straightforward distillation provided that the non-aqueous liquid has a boiling point higher than that of either of them. If desired, the distillation may be carried out under sub-atmospheric pressure.

The non-aqueous dispersions of polymer microparticles obtained by the foregoing procedure may be incorporated directly into a coating composition, the main film-forming constituent of which is compatible with the polyethylene glycol-derived stabilising chains of the microparticles. Whether a particular film-forming constituent is thus compatible may be determined by simple tests in known manner, for example by casting a film from a blend of the constituent in question and the polyethylene glycol to which the stabilising chains correspond.

Alternatively, the composite microparticles may first be isolated from the dispersion, for example by spray drying, and then be incorporated into a liquid coating composition as a dry powder. As a further alternative, the dry microparticles thus isolated may be blended into a powder coating composition.

According to the nature of the polymer microparticles, as already indicated, their presence in the coating composition may either modify the rheological properties of the composition so as to secure improvements in the application characteristics of the latter, e.g. a reduced tendency for "sagging" of the film to occur on the substrate immediately following application; or it may modify the ultimate properties of the coating film, as for example by rendering it less brittle.

The invention is illustrated but not limited by the following Examples, in which parts and percentages are by weight:

EXAMPLE 1

(1) Preparation of sterically stabilised acrylic latex

A reaction flask was fitted with thermometer, stirrer, provision for blanketing the contents with nitrogen and an up-and-over condenser system reconnected to the flask via a mixing chamber. The flask was heated in a water-bath. Monomer to be polymerised was fed by means of a pump at a controlled rate into the mixing chamber where, under operating conditions, it became diluted with returning distillate before entering the flask.

The following charges were prepared:

| | | |
|---|---|---|
| A. | Distilled water | 315 parts |
| | Methanol | 500 parts |
| | Methacrylic acid ester of methoxypolyethylene glycol, mol. wt. 1900 | 18.4 parts |
| B. | Butyl acrylate | 40.8 parts |
| | Styrene | 9.2 parts |
| | Azodiisobutyronitrile | 1.0 parts |
| C. | Allyl methacrylate | 8.3 parts |
| | Methacrylic acid ester of methoxypolyethylene glycol, mol. wt. 1900 | 13.5 parts |
| | Butyl acrylate | 295 parts |
| | Styrene | 68 parts |
| | Azodiisobutyronitrile | 5 parts |

Charge A was introduced into the flask, Charge B was added thereto and the mixture heated to reflux temperature (about 74° C.). After 1 hour a fine bluish-white dispersion of seed polymer particles had formed, and Charge C was then fed in via the pump over a period of 3 hours. When the addition was complete, refluxing was continued for a further 1 hour to ensure complete conversion of monomers and crosslinking of the polymer. The sub-micron particle size latex thus obtained had a solids content of 32.6%. The gel content of the microparticles was measured by treating the particles with tetrahydrofuran, then centrifuging off, drying and weighing the residual gel. A gel content of 97.8% was found, indicating good conversion of monomer and efficiency of crosslinking.

(2) Transfer of microparticles to non-aqueous medium

The microparticle latex obtained from step (1) (300 g) was added slowly to refluxing toluene (b.p. 110° C.) (1100 g) in a 2-liter flask fitted with stirrer, thermometer, dropping funnel and Dean and Stark separator. The water and methanol were removed from the system as azeotropes with some of the toluene as the distillate temperature gradually climbed back to 110° C. Approximately 400 g of distillate was collected. The flask then contained a stable, transparent dispersion of the microparticles in toluene; this had a solids content of 11% and a viscosity of 0.6 poise. The microparticle polymer composition was butyl acrylate 79.7%, styrene 18.3%, allyl methacrylate 2.0%.

EXAMPLE 2

The aqueous microparticle latex (50 g) obtained as described in Example 1(1) was added slowly to butanol (300 g) at reflux temperature (115° C.) over a period of 30 minutes, in the manner described in Example 1(2). A total of 180 g of water/methanol/butanol distillate was collected over about 1 hour, when the reflux temperature had returned to 115° C. The product was a stable dispersion of microparticles in butanol, having a solids content of 10.7% and a viscosity of 0.2 poise. In contrast to the dispersion obtained in Example 1(2), this product was milky in appearance owing to the difference in refractive index between the gel polymer and the butanol.

EXAMPLE 3

The procedure of Example 2 was repeated, but using instead of the 300 g of butanol an equal weight of ethyl acetate (b.p. 77° C.). During the removal of a water/methanol/ethyl acetate distillate, fresh ethyl acetate was added from time to time in order to replace that lost. A stable, milky dispersion of microparticles in ethyl acetate was obtained; this had a solids content of 8.6% and a viscosity of 0.1 poise.

EXAMPLE 4

(1) Preparation of sterically stabilised acrylic latex

A microparticle latex was prepared following the procedure described in Example 1(1), but the monomers employed were selected so as to give a final polymer composition of butyl acrylate 39%, styrene 10%, 2-ethylhexyl acrylate 25%, acrylonitrile 24.5%, allyl methacrylate 1.5%. The latex obtained had a solids content of 32.3%.

(2) Transfer of microparticles to non-aqueous medium

The latex (150 g) obtained in step (1) was added slowly to refluxing toluene (500 g), following the procedure of Example 1(2). Over a period of 1½ hours, a total of 252 g of water/methanol/toluene distillate was removed, yielding a transparent, yellowish dispersion of the microparticles in toluene having a solids content of 12.1% and a viscosity of approximately 0.2 poise.

EXAMPLE 5

The procedure of Example 1(1) was repeated, except that the allyl methacrylate was replaced by an equal weight of ethylene glycol dimethacrylate. The resulting latex had a particle size of 0.40 micron and a solids content of 29.7%.

The latex (100 parts) was then transferred to toluene (415 parts) as described in Example 1(2), methanol and water being removed until a distillation temperature of 110° C. was attained. The resulting dispersion of microparticles in toluene had a viscosity of 1.0 poise and a solids content of 16.7%.

EXAMPLE 6

The procedure of Example 1(1) was repeated, but replacing the methacrylic acid ester of methoxypolyethylene glycol of mol. wt. 1900 by an equal weight of the methacrylic acid ester of methoxypolyethylene glycol of mol. wt. 4500. The latex obtained had a particle size of 1.5 micron and a solids content of 32.1%.

The latex (100 parts) was diluted with methanol (50 parts) and transferred to toluene (756 parts) as described in Example 1(2). Methanol and water were removed until the distillation temperature reached 110° C. The resulting dispersion of microparticles in toluene had a viscosity of 0.6 poise and a solids content of 10.5%.

We claim:

1. A process for the production of a stable dispersion in a non-aqueous liquid medium of microparticles of diameter from 0.01 to 10 microns composed of a cross-linked polymer, the process comprising the steps of (1) polymerising one or more ethylenically unsaturated monomers, including at least one crosslinking monomer, from which the crosslinked polymer is to be derived, in an aqueous medium comprising (a) at least 30% by weight of water and (b) not more than 70% by weight of a second constituent which is miscible with water, the nature and proportion of which are such that the mixture as a whole is capable of dissolving the monomer or monomers being polymerised to the extent of at least 3% by weight but is a non-solvent for the polymer formed, the polymerisation being carried out at a temperature at least 10° higher than the glass transition temperature of the polymer in the presence in the aqueous medium as steric stabiliser of a block or graft copolymer which contains in the molecule (i) a polymeric component which is solvatable by the aqueous medium and which consists of at least one polymer chain derived from a polyethylene glycol of mol. wt. at least 1000, and (ii) another polymeric component which is not solvatable by the aqueous medium, the concentration of free monomer in the polymerisation mixture being maintained throughout this process step at a level such that at no time does the free monomer form a separate phase and the total amount of monomer polymerised being such that the resulting dispersion contains at least 20% by weight of microparticles, and (2) transferring the polymer microparticles from the resulting dispersion into a non-aqueous liquid medium, the said liquid medium being one which is capable of dissolving, to the extent of at least 10% by weight at room temperature, the polyethylene glycol from which the above-mentioned solvatable component of the block or graft copolymer is derived when the said polyethylene glycol is in a non-hydrated state.

2. A process as claimed in claim 1, wherein the ethylenically unsaturated monomer is selected from acrylic acid, methacrylic acid and the alkyl esters thereof.

3. A process as claimed in claim 1 or claim 2, wherein the crosslinking monomer is a monomer which is polyfunctional with respect to the polymerisation reaction.

4. A process as claimed in any one of claims 1 to 3, wherein the temperature of polymerisation is at least 30° C. higher than the polymer glass transition temperature.

5. A process as claimed in any one of claims 1 to 4, wherein the water-miscible constituent of the aqueous medium is methanol or ethanol.

6. A process as claimed in any one of claims 1 to 5, wherein the block or graft copolymer stabiliser is produced in situ during the polymerisation by introducing into the polymerisation mixture, before polymerisation begins, a precursor compound comprising in its molecule the residue of a polyethylene glycol or a monoalkyl ether thereof and an unsaturated grouping which is capable of copolymerising with the monomer or monomers.

7. A process as claimed in claim 6, wherein the residue of a polyethylene glycol, or a monoalkyl ether thereof, has a molecular weight in the range 2000–4000.

8. A process as claimed in any one of claims 1 to 7, wherein step (2) is accomplished by blending the aqueous dispersion obtained from step (1) with the non-aqueous medium and then removing the water and the water-miscible second constituent of the aqueous medium by distillation as an azeotropic mixture.

9. A coating composition comprising polymer microparticles produced by the process claimed in any one of claim 1 and a main film-forming constituent which is compatible with the polyethylene glycol-derived stabilising chains of the microparticles.

* * * * *